(12) United States Patent
Brkovic

(10) Patent No.: US 6,828,762 B2
(45) Date of Patent: Dec. 7, 2004

(54) INDUCTOR CURRENT SENSING IN ISOLATED SWITCHING REGULATORS AND RELATED METHODS

(75) Inventor: Milivoje Slobodan Brkovic, Carlsbad, CA (US)

(73) Assignee: di/dt, Inc., Carlsbad, CA (US)

(*) Notice: Subject to any disclaimer, the term of this patent is extended or adjusted under 35 U.S.C. 154(b) by 0 days.

(21) Appl. No.: 10/187,782

(22) Filed: Jul. 2, 2002

(65) Prior Publication Data

US 2004/0114404 A1 Jun. 17, 2004

Related U.S. Application Data

(60) Provisional application No. 60/303,125, filed on Jul. 5, 2001.

(51) Int. Cl.[7] ................................................. G05F 1/40
(52) U.S. Cl. ...................... 323/222; 323/282; 323/266
(58) Field of Search ................................ 323/222, 223, 323/266, 282, 284

(56) References Cited

U.S. PATENT DOCUMENTS

| | | | | |
|---|---|---|---|---|
| 5,982,160 A | * | 11/1999 | Walters et al. ............... | 323/282 |
| 6,140,808 A | * | 10/2000 | Massie ......................... | 323/284 |
| 6,166,527 A | * | 12/2000 | Dwelley et al. .............. | 323/222 |
| 6,366,070 B1 | * | 4/2002 | Cooke et al. ................. | 323/284 |
| 6,404,175 B1 | * | 6/2002 | Yang et al. ................... | 323/282 |
| 6,441,597 B1 | * | 8/2002 | Lethellier .................... | 323/282 |
| 6,522,115 B1 | * | 2/2003 | Greitschus ................... | 323/288 |
| 6,628,106 B1 | * | 9/2003 | Batarseh et al. ............. | 323/222 |

* cited by examiner

Primary Examiner—Bao Q. Vu
(74) Attorney, Agent, or Firm—Lowenstein Sandler PC

(57) ABSTRACT

A switching regulator includes at least two power switches and two rectifier switches, power transformer having a primary and secondary windings, control circuit for generating control pulses for the power switches, an inductor for providing output current to the load and connected, and a current sensor coupled to the secondary windings and the inductor for sensing current passing through the inductor. The current sensor preferably includes a first and second resistor and a capacitor connected together, and provides a sensed voltage at its output proportional to the product of output current of the inductor and inherent DC resistance of the inductor and the secondary windings. The current sensor is coupled to the control circuit for regulation and protecting the switching regulator against overload or short circuit conditions.

34 Claims, 6 Drawing Sheets

INDUCTOR CURRENT SENSING IN ISOLATED SWITCHING REGULATORS AND RELATED METHODS

CROSS-REFERENCE TO RELATED APPLICATIONS

This application claims the priority benefit of U.S. Provisional Application No. 60/303,125, filed Jul. 5, 2001, which is hereby incorporated herein by reference. This application is related to U.S. patent application Ser. No. 10/187,645, filed Jul. 2, 2002, now U.S. Pat. No. 6,567,279, issued May 20, 2003, to Miki Brkovic, entitled: *Simple and Efficient Isolated Switching Regulator For Fast Transient Loads*, which is hereby incorporated herein by reference.

FIELD OF THE INVENTION

This invention relates generally to switched-mode power converters and more particularly it provides a lossless output current sensing in isolated converters using inherent resistance of the output inductor and secondary windings of an isolation transformer.

BACKGROUND DISCUSSION

Switching regulators are widely used to supply power to electronic devices, such as in computers, printers, telecommunication equipment, and other devices. Such switching regulators are available in variety of configurations for producing the desired output voltage or current from a source voltage with or without galvanic isolation. The former are also known as an isolated power converters and the later are called a non-isolated power converters. For all the switching regulators it is common that they have at least one controllable power switch, inductor connected with one end to power switch and second end to output capacitor, control circuit for providing regulation of the output voltage or current and driver for at least one power switch. Control circuit further comprises at least output voltage sensing circuit and either power switch current or inductor current sensing circuit, reference voltage and pulse width modulation (PWM) circuit. A signal proportional to either switch or inductor current is usually used for either overload protection or for implementation of current mode control which has variety of implementations (e.g. peak current mode control, hysteretic current mode control, average current mode control and etc.). Output of PWM circuit is fed into driver circuit which generates appropriate drive signals for power switch or switches. While output voltage and switch current sensing are well known in practice, inductor current sensing has different methods and associated circuits with it.

A signal proportional to the inductor's current (in most cases output inductor current is sensed) may be used to limit component stress during output overloads (overload protection). However, a regulation application needs a higher fidelity current signal than the overload protection application. Typically thermal design of the switching regulator is sized for maximum efficiency, and the worst case variation of the overload trip level (current signal) still maintains the components below their maximum ratings. Unfortunately, the waveshape may not be suitable for regulation, and in any sensing circuit bandwidth must be sufficient in view of the switching frequency.

Perhaps the most common approach to sensing the output inductor current indirectly in isolated topologies is to use sense resistor in series with power switches. Use of sense resistor in single ended topologies, such as for example forward, flayback and others, as well as in full-bridge and push-pull topologies, allows that one end of sense resistor is connected to GND pin of control chip, usually connected to input return, which simplifies current sensing. On other hand, the sensing resistor value must be large enough to keep the sensed signal above the noise floor and yet small enough to avoid excessive power dissipation. In case of half-bridge converter, for example, this approach is not good since only one primary side power switch is connected to input return and sensed signal does not reflect current through second, floating primary side power switch switch. Using sense resistor in return input path is also not good solution since sensed current is not exactly current through power switches but rather an input current of the converter smoothed by input capacitors. Also, sensed switch current differs from the output inductor current due to magnetizing current of isolation transformer which also varies with the input voltage. In applications where constant output current characteristic is required additional circuitry is needed to compensate for difference between sensed current and output inductor current. For some applications, the value of the sensing resistor may be close or exceed the on resistance of the power switches. Another approach is to use current sense transformer but this approach becomes unacceptable in applications where small size and low profile of the power converter is must.

In cases where control circuit is referenced to the output of the converter or output inductor current is needed to be sensed (e.g. applications where fast transient response to step load changes is required) the most common approach is to the sensing resistor in series with the output inductor. The circuit reconstructs the output inductor current as a differential voltage across the sensing resistor. Most IC's using this approach regulates output voltage with current mode control and use the signal for output voltage feedback.

The sensing resistor value must be large enough to provide good signal to noise ratio and yet small enough to avoid excessive power dissipation. Since the power dissipated in the sensing resistor increases with the square of the inductor current, this approach has the obvious efficiency drawback with high output current and low output voltage. For low voltage, high current applications, the value of the sensing resistor may be close or even higher than the on resistance of the power switch and inductor which are minimized for maximum efficiency. Thus, sensed signal is relatively small and requires use of more expensive either comparators or amplifiers.

Power inductors are known to have parasitic (or inherent) winding resistance, and therefore can be represented by an equivalent circuit of a series combination of an ideal inductor and a resistor. When direct (DC) current flows through the inductor (or a current having a DC component), a DC voltage drop is imposed across the inductor, which voltage is a product of the magnitude of the DC (component of the) current and the parasitic resistance of the inductor. Since such an inductor may already be present in the circuit, there is no an additional loss of efficiency in using the inductor for this purpose.

U.S. Pat. No. 3,733,536, issued to Gillow and Marple, discloses a current sensor which uses a sense winding with an equivalent number of turns as the filter's inductor has and is magnetically coupled to it in a voltage canceling relationship. The current sensor provides a sense output signal which is proportional to the filter's output current and derived substantially from the voltage drop across the effective DC resistance of the inductor. The main drawbacks of this approach are that an additional winding of the output inductor is needed with same numbers of turns as the main winding carrying current which, adds complexity in inductor design (particularly when planar magnetics is used), sensed signal is DC without inductor current ripple information thus, it cannot be used neither for peak current mode control nor suppressing variations in the input voltage (feedforward) and amplitude of the sensed signal is proportional only to parasitic resistance of the inductor.

Parasitic resistance of the output inductor is used for current sensing without additional winding sensing but rather sensing DC voltage across the output inductor as described in U.S. Pat. No. 5,465,201, issued to Cohen, U.S. Pat. No. 5,877,611, issued to Brkovic, U.S. Pat. No. 5,982,160, issued to Walters et al. and U.S. Pat. No. 6,127,814, issued to Goder, which patents are hereby incorporated herein by reference. Again, sensed signal is limited to product of inductor's winding resistance and inductor current and can be increased only by means of active amplification, which adds complexity, inaccuracy and mostly additional cost. In order to maximize efficiency of the converter, inductor's parasitic resistance (particular at high current applications) has to be minimized thus, the sensed signal is relatively small and requires use of more expensive either comparators or amplifiers. Very often error due to offset in comparator and/or amplifier is larger than variation in the winding resistance of the inductor (windings printed on the PCB).

SUMMARY OF THE INVENTION

Therefore, it is an object of the present invention to provide an efficient switching regulator and associated methods which provide for accurate sensing of the output current with increased amplitude of the sensed signal in a switched mode power converter for regulation and protection against overload or short circuit conditions.

This and other objects, features and advantages in accordance with the present invention are provided by The switching regulator comprising an input voltage source, a switching circuit and an transformer for coupling the input voltage source and an output stage, the switching circuit comprising at least two controllable power switches and a first and a second rectifier switch, the transformer comprising at least one primary winding connected to the input voltage source via at least two controllable power switches and a first and a second secondary windings, the first and the second secondary winding having inherent resistances, the first and the second secondary windings connected together in series at a first node, the first and the second rectifier switches connected in series at a second node, the first secondary windings connected to the first rectifier switch at a third node, the second secondary winding connected to the second rectifier switch at fourth node, the output stage having a output stage input and a output stage output, the output stage input connected to the first node and the second node, the output stage output connected to a load circuit, the output stage input and the output stage output having a common node, the output stage comprising an inductor for providing output current to the load circuit, the inductor having a first terminal for coupling to the output stage input and a second terminal for coupling to the output stage output, the inductor having an inherent resistance, the output current thereby providing a voltage between the third node and the second terminal of the inductor and a voltage between the fourth node and the second terminal of the inductor including a DC voltage component proportional to the sum of inherent resistance of the first secondary winding and the second secondary winding and inductor and to the output current; a current sensor having a current sensor input and a current sensor output, the current sensor input connected to the third node and to the fourth node and the second terminal of the inductor, the current sensor providing DC voltage component at the current sensor output; the current sensor output connected to a control circuit, the control circuit adjusting an operating parameter of the switching circuit. The current sensor preferably comprises a first and a second resistor and a capacitor, the first resistor having a first and a second terminal, the second resistor having a first and a second terminal, the capacitor having a first and a second terminal, the first terminal of the first resistor coupled to the node three and the first terminal of the second resistor coupled to the node four, the second terminal of the first resistor coupled to the first terminal of the second resistor and the first terminal of the capacitor at a node five, the second terminal of the capacitor coupled to the second terminal of the inductor.

An inductance and a direct current (DC) resistance of the inductor together with a leakage inductance and a DC resistance of the first and the second secondary windings define a first time constant. In one embodiment, the first resistor, second resistor and capacitor of the current sensor define a second time constant within a predetermined range of the first time constant. In another embodiment, the first resistor and the second resistor and capacitor of the current sensor define a second time constant substantially equal to the first time constant.

In one embodiment of the invention the switching regulator may also include a voltage regulation circuit cooperating with the peak current control loop circuit for setting a peak current level. The voltage regulation loop circuit may include a voltage divider connected to the output of the switching regulator for generating a signal related to the output voltage.

The switching regulator may also include a voltage regulation circuit cooperating with the average current control loop circuit for setting an average current level.

According to another aspect of the invention, the current sensor preferably defines a sensing bandwidth substantially above the predetermined switching frequency of the switching regulator.

The switching regulator may also include an overload protection circuit connected to the current sensor. In one embodiment inductor peak current is sensed in order to provide cycle by cycle current limit. In another embodiment average current is sensed in order to provide more precise current limit independent of the operating conditions of the converter.

Another embodiment of the invention relates to a method of providing output current sensing in The switching regulator circuit comprising an input voltage source, a switching circuit and an transformer for coupling the input voltage source and an output stage, the switching circuit comprising at least two controllable power switches and a first and a second rectifier switch, the transformer comprising at least one primary winding connected to the input voltage source via at least two controllable power switches and a first and a second secondary windings, the first and the second secondary winding having inherent resistances, the first and the second secondary windings connected together in series at a first node, the first and the second rectifier switches connected in series at a second node, the first secondary windings connected to the first rectifier switch at a third node, the second secondary winding connected to the second rectifier switch at fourth node, the output stage having a output stage input and a output stage output, the output stage input connected to the first node and the second node, the output stage output connected to a load circuit, the output stage input and the output stage output having a common node, the output stage comprising an inductor for providing output current to the load circuit, the inductor having a first terminal for coupling to the output stage input and a second terminal for coupling to the output stage output, the inductor having an inherent resistance, the output current thereby providing a voltage between the third node and the second terminal of the inductor and a voltage between the fourth node and the second terminal of the inductor including a DC voltage component proportional to the sum of inherent resistance of the first secondary winding and the second secondary winding and inductor and to the output current; the method comprising the steps of providing a current sensor having a current sensor input and a current sensor output, the current sensor input connected to the third node and to the fourth node and the second terminal of the inductor, the current sensor providing DC voltage component at the current sensor output; the current sensor output connected to a control circuit, the control circuit adjusting an operating parameter of the switching circuit. The current sensor preferably comprises a first and a second resistor and a capacitor, the first resistor having a first and a second terminal, the second resistor having a first and a second terminal, the capacitor having a first and a second terminal, the first terminal of the first resistor coupled to the node three and the first terminal of the second resistor coupled to the node four, the second terminal of the first resistor coupled to the first terminal of the second resistor and the first terminal of the capacitor at a node five, the second terminal of the capacitor coupled to the second terminal of the inductor. The current sensor circuit may include offset means to offset the DC voltage component at the current sensor output by a predetermined amount. Also, the current sensor may include means to compensate temperature dependence of the sensed signal due to temperature dependence of the secondary windings and inductor DC resistances.

An inductance and a DC resistance of the inductor and secondary windings define a first time constant. In one embodiment, the method also includes the step of selecting the resistors and capacitor of the current sensor to define a second time constant within predetermined range of the first time constant, or the first and the second time constants may be substantially equal.

BRIEF DESCRIPTION OF THE DRAWING

The objects, advantages and features of the invention will be more clearly perceived from the following detailed description, when read in conjunction with the accompanying drawing, in which.

DETAILED DESCRIPTION OF THE PREFERRED EMBODIMENTS

Figure 1:
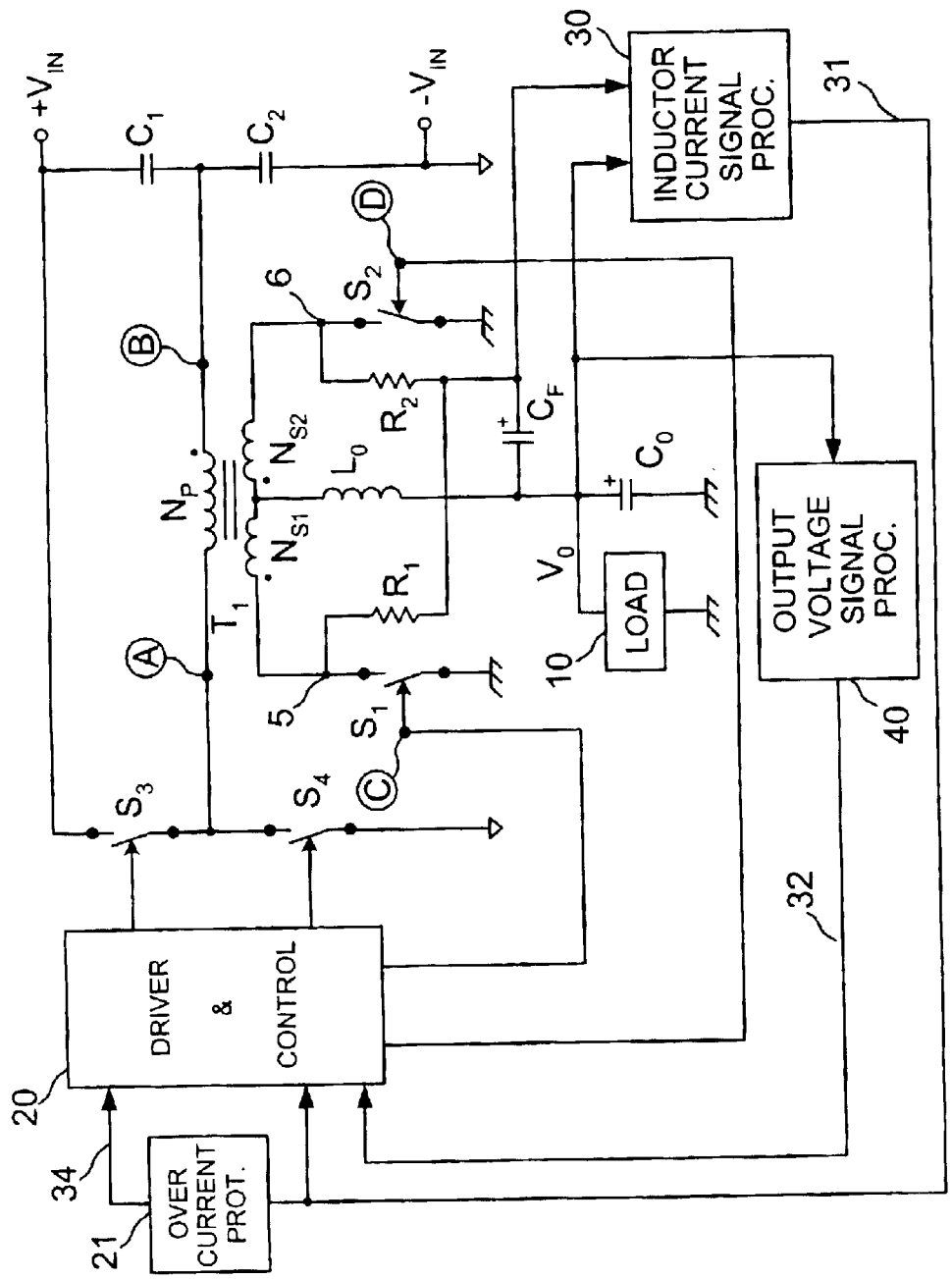
FIG. 1 is a schematic circuit diagram of an embodiment of The switching regulator circuit including output current sensing according to the invention.

With reference now to FIG. 1, there is shown a switched mode power supply circuit including output current sensing according to the invention. The power converter is a half-bridge shown as an example. Power switches $S_3$, $S_4$, rectifier switches $S_1$ and $S_2$, capacitors $C_1$, $C_2$ and $C_0$, transformer $T_1$ and inductor $L_0$ form a half-bridge dc-to-dc converter. The invention could also be embodied in any topology including but no limited to push-pull and full-bridge topologies and their derivatives. For simplicity and generality of description the ideal switches $S_1$–$S_4$ are used. Their practical realization will vary depending of the application. Power switches, $S_3$ and $S_4$, are very often realized with MOSFETs in practice but could be also bipolar transistors or IGBTs (isolated gate bipolar transistors) which, depends of application. Rectifier switches, $S_1$ and $S_2$, could be realized in practice with diodes, current bidirectional switches such as MOSFETs or voltage bi-directional switches such as magnetic amplifiers.

Input voltage $V_{IN}$ is split with capacitors $C_1$ and $C_2$. One side of primary $N_P$ of transformer $T_1$ is connected to the common node B of capacitors $C_1$ and $C_2$ while the second end is connected to the common node A of switches $S_3$ and $S_4$. Two secondary windings $N_{S1}$ and $N_{S2}$ are identical and connected in series. The common point of these windings $N_{S1}$ and $N_{S2}$ is connected to one end of output inductor $L_0$, while second end of inductor $L_0$ is connected to capacitor $C_0$ that is connected across the output of the converter. The second end of winding $N_{S1}$ is connected to rectifier switch $S_3$ while the second end of winding $N_{S2}$ is connected to rectifier switch $S_4$. Drive waveforms for switches are such that when switch $S_3$ is on, switch $S_4$ is off, rectifier switch $S_1$ is on and $S_2$ is off. Power is delivered from $V_{IN}$ to the load 10. Load current flows through switch $S_3$, winding $N_P$, rectifier switch $S_1$, secondary winding $N_{S1}$, and output inductor $L_0$. In contrast, when switch $S_4$ is on, switch $S_3$ is off, rectifier switch $S_1$ is off and $S_2$ is on. Power is delivered from $V_{IN}$ to the load 10. Load current flows through switch $S_4$, winding $N_P$, rectifier switch $S_2$, winding $N_{S2}$ and output inductor $L_0$. When both switches $S_3$ and $S_4$ are off, switches $S_1$ and $S_2$ are both on and load current splits in between $S_1$ and $S_2$ and windings $N_{S1}$ and $N_{S2}$ thus, shorting transformer $T_1$. Power switches $S_3$ and $S_4$ could be either bipolar transistors, MOSFETs, but may also be realized as IGBTs (isolated gate bipolar transistors).

The current sensor circuit comprises resistors $R_1$ and $R_2$ and capacitor $C_F$ forming a low pass filter. Resistor $R_1$ is connected with its first terminal to common node of winding $N_{S1}$ and rectifier switch $S_1$, while second terminal of $R_1$ is connected to first terminal of capacitor $C_F$. The second terminal of capacitor $C_F$ is connected to common node of output inductor $L_0$, capacitor $C_0$ and load 10, thus to the output $V_0$ of the converter. Similarly, resistor $R_2$ is connected with its first terminal to common node of winding $N_{S2}$ and rectifier switch $S_2$, while second terminal of $R_2$ is connected to the first terminal of capacitor $C_F$. The voltage $V_F$ across capacitor $C_F$ is proportional to the current through output inductors $L_0$ current and thus is used for indirect measurement of output inductor's current $I_L$. Voltage $V_F$ is fed into inductor current processing circuit 30 (it could be an amplifier for amplifying voltage $V_F$ or passive circuit combining resistors and capacitor) which, generates signal 31 fed into drive and control circuit 20 and into over-load protection circuit 21 as shown in FIG. 1. Output of over-current protection circuit 21, 34, is fed into 20. Output voltage $V_O$ is fed into output voltage signal processing circuit 40 whose output 32 is fed into 20. The drive and control circuit 20 combine at least a modulator and a driver for switches $S_1$–$S_4$. The modulator generates signal for adjusting an operating parameter of the driver in response to signals 32 and 31. The driver than controls switch $S_1$–$S_4$ and adjust operating parameter of the converter in order to regulate output voltage or output current of the converter. For simplicity, but without loss of generality, galvanic isolation in between input and the output of the switching regulator in FIG. 1 is omitted since it does not affect on the invention.

Those of skill in art will readily appreciate the various constructions and operations of the drive and control circuit 20 as well as the inductor current processing circuit 30 and over-current protection circuit 21. The modulator could be, for example, pulse width modulator (PWM) as well as any other type of modulator operating at constant or variable switching frequency. Also, the control circuit, comprising of the modulator, could be of voltage mode or current mode type. In applications where PWM voltage mode control is implemented in 20, signal 31 is fed only into over-current protection 21, for limiting the output current of the converter. The output 34 of 21 is used for controlling the output current and could be either analog (an over-current detection amplifier is used) or discrete (a comparator is used). If output 34 is the analog signal, it may be used directly by the PWM modulator in circuit 20 to control the duty cycle of the converter in order to provide either constant output current or a fold-back current limit characteristic, that is, to reduce the current limit in an overload or short circuit conditions. If a comparator were used in 21 instead of an over-current detection amplifier, the discrete ON/OFF output of the converter could be used to block the output of the modulator into the driver in circuit 20, for example, by inserting an AND gate in the circuit. When the PWM current mode control (for example, peak current mode, average current mode, hysteretic current mode, among others) is implemented in drive and control circuit 20, signal 31 is also used by current mode control circuit. The current sensed signal is processed through inductor current signal processing circuitry 30 to properly condition the signal for application to the modulator in driver and control circuit 20. Those of skill in the art will readily appreciate the construction of the many possible end equivalent variations of the inductor current signal processing circuitry 30.

The output voltage signal processing circuit 40 (shown in FIG. 1) will also be appreciated by those skilled in the art. It is usually comprised of output voltage sensing, a reference to which sensed output voltage is compared, and an amplifier for generating a voltage feedback signal 32 fed into the modulator in drive and control circuitry 20. If PWM voltage mode control is used, the voltage feedback signal 32 is compared with sawtooth voltage signal in the modulator. Alternatively, when current mode control is implemented in circuit 20, voltage feedback signal 32 sets the desired current level which is compared with the output 31 of the inductor current signal processing circuitry 30 in the PWM modulator in circuitry 20 in order to control the duty cycle of the converter.

Figure 2:
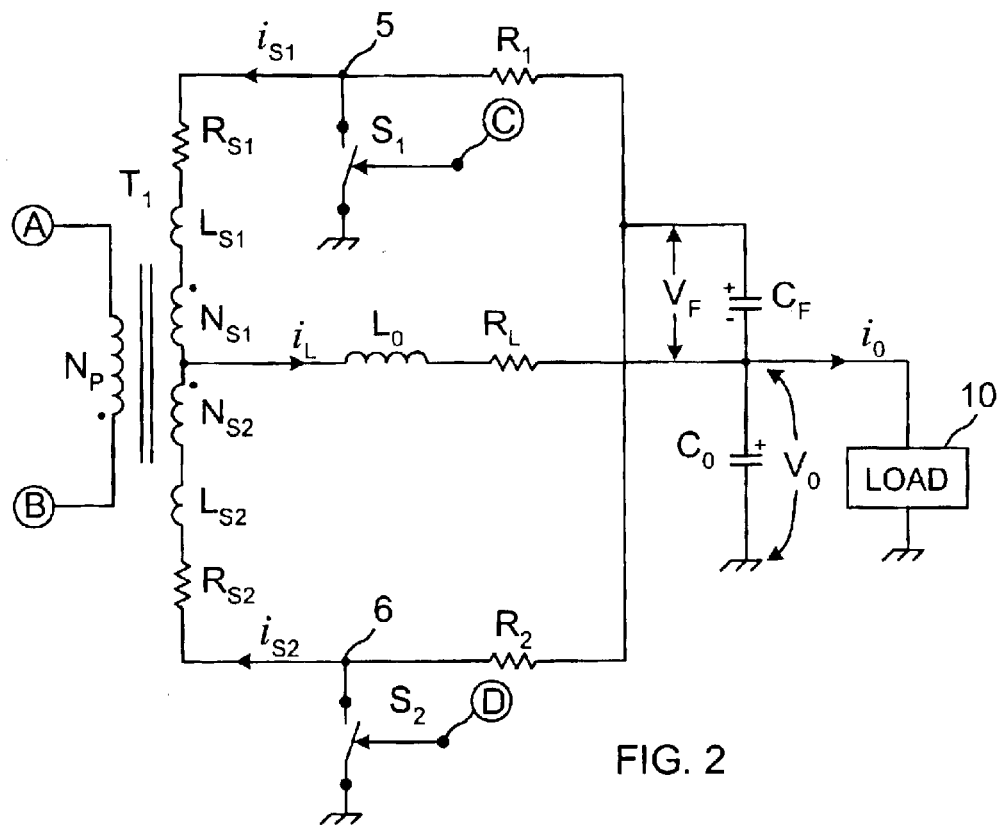
FIG. 2 is a partial simplified schematic circuit diagram of the circuit from FIG. 1 showing current sensing circuit in greater detail.

FIG. 2 shows the output circuit of the converter of FIG. 1 and includes parasitic resistances, $R_{S1}$, $R_{S2}$ and $R_L$, of windings $N_{S1}$ and $N_{S2}$ and output inductor $L_0$, respectively. Circled letters A, B, C, and D in FIG. 2 correspond to the positions in FIG. 1. In practice all magnetic components, such as inductors and transformers, include a winding that is either wire or traces on the printed circuit board (PCB), that surrounds a magnetic material or air. The winding thus has, in addition to its inductance, also distributed resistance that can be measured as a DC resistance of the winding. A fairly good model of the practical inductor or winding of the transformer lumps the distributed winding resistance into a single resistor that is in series with the ideal inductance. Output inductor $L_0$ is modeled as a series combination of its DC winding resistance and its inductance $L_0$. Since a transformer is not energy storage device, as an inductor, but rather voltage source, the self inductance of the transformer winding is not important for the invention but rather leakage inductances, $L_{S1}$ and $L_{S2}$, of the secondary windings, which appear to be in series with the output inductor. Thus, the secondary winding of transformer $T_1$ is represented as a series connection of the winding DC resistances, $R_{S1}$ and $R_{S2}$, leakage inductance of the winding, $L_{S1}$ and $L_{S2}$, and number of turns $N_{S1}$ and $N_{S2}$, respectively.

Figure 3:
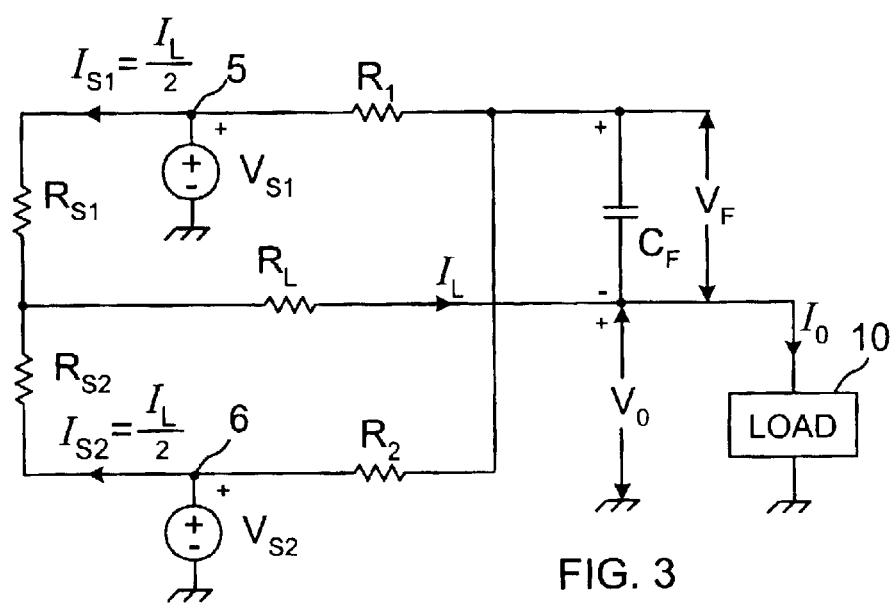
FIG. 3 is schematic circuit diagram of DC equivalent circuit of the circuit from FIG. 2 used for calculating the current sensed voltage.

In steady state, the average or DC voltage across inductor $L_0$, and secondary windings $N_{S1}$ and $N_{S2}$ is zero. Equivalent DC circuit for circuit of FIG. 2 is obtained by shorting windings $N_{S1}$ and $N_{S2}$, and the inductance of output inductor $L_0$ and replacing switches $S_1$ and $S_2$ with DC voltage sources $V_{S1}$ and $V_{S2}$, respectively as shown in FIG. 3. Since, for the circuit from FIG. 1, $N_{S1}=N_{S2}$, the DC current, $I_L$ ($I_L=I_0$), through output inductor $L_0$ is split in half through the resistors $R_{S1}$ and $R_{S2}$. The DC voltage $V_F$ voltage across the capacitor $C_F$ is calculated to be:

$$V_F = I_L\left(R_L + \frac{R_{S1}}{2}\right)\frac{R_2}{R_1 + R_2} + I_L\left(R_L + \frac{R_{S2}}{2}\right)\frac{R_1}{R_1 + R_2} \quad \text{(Eq. 1)}$$

For simplicity, assume that $R_{S1}=R_{S2}=R_S$ and $R_1=R_2=R$. Consequently, $V_{S1}=V_{S2}$. After basic arithmetic operations, the DC voltage $V_F$ can be expressed as product of the DC output inductors current $I_L$ and sum of output inductor resistance $R_L$ and resistance $R_S$ of each secondary winding:

$$V_F = I_L R_L\left(1 + \frac{R_{S1}}{2R_L}\right) \quad \text{(Eq. 2)}$$

$V_{CF}=R_L*I_L+R_S*I_L=(1+0.5*R_S/R_L)*I_L*R_L$.

An advantage, among others, of the invention is that the voltage $V_F$ across the capacitor $C_F$ is $$\left(1 + \frac{R_{S1}}{2R_L}\right)$$

times higher than in prior art represented by U.S. Pat. Nos. 3,733,536; 5,877,611; 5,877,611; 5,982,160; and 6,127,814, (which patents are hereby incorporated herein by reference) for substantially the same DC resistance of the output inductor and load current. In order to demonstrate why increase in the current sensed voltage is indeed significant improvement, consider some practical numbers, such as: $I_0=20A$, $R_L=2$ m$\Omega$, $R_S=4$ m$\Omega$. Since only half of the output inductor current flows through each secondary winding and power dissipation is given as a product of the resistance and square of the current flowing through the resistance, the power dissipation due to DC resistance of the inductor will be equal to total power dissipation due to DC resistance in both secondary windings. The sensed signal in the known prior art will about 40 mV but and in the present invention it will be about 80 mV, a 100% increase. Having in mind that standard amplifiers and comparators have offset voltage of +/−6 mV over entire temperature range of −40 C. to +85 C., known prior art current sensing will have an error due to offset voltage of about +/−15% or about +/−3 A while, such error in the present invention due to offset will be only about +/−7.5% or about +/−1.5 A. Thus, the output inductor will have 1.5 A more headroom in the present invention which, in turn, reduces the worst case stresses on all power components (switches, transformer and inductor) during overload or short circuit conditions. The present invention further allows a decrease in the DC resistances of the output inductor and secondary windings of the transformer by 7.5% for the same level of the current sensed signal thus, decreasing the power dissipation in the output inductor and the secondary windings of the transformer. In this way the present invention also provides improvement in the overall efficiency of the converter.

Figure 4A:
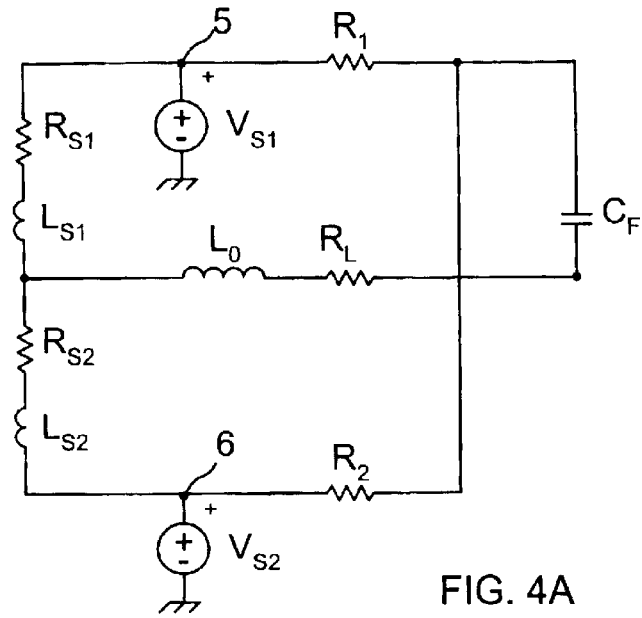
FIG. 4A is a schematic circuit diagram of the equivalent circuit of the circuit from FIG. 2 used for calculating a first and a second time constant.
Figure 4B:
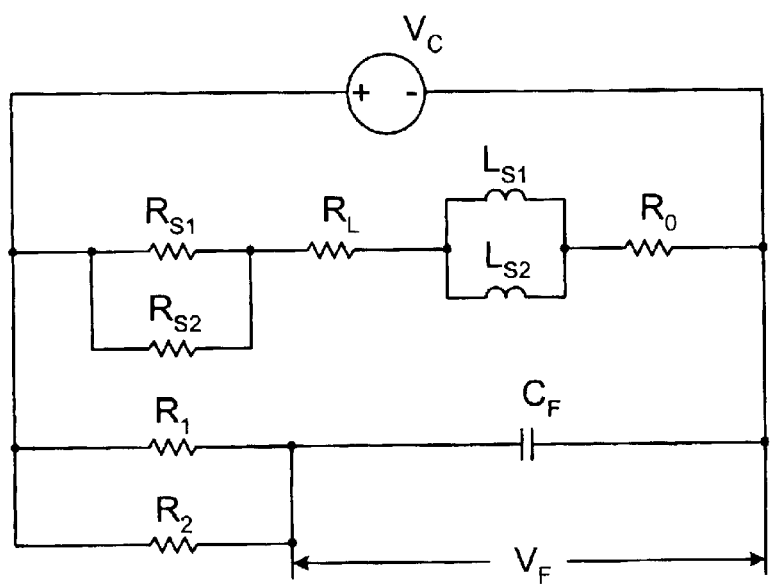
FIG. 4B is a simplified schematic circuit diagram of the circuit from FIG. 4A.

FIG. 4A shows equivalent circuit of the circuit in FIG. 2 used for calculating a first time constant defined by the leakage inductances, $L_{S1}$ and $L_{S2}$, of the secondary windings, the inductance $L_0$ of the output inductor, together with their DC resistances, and a second time constant defined by resistances of the resistors $R_1$ and $R_2$ and the capacitance of capacitor $C_F$. The first time constant is inherent to the converter while the second time constant is a time constant of the current sensor circuit defined by choosing values of resistors $R_1$ and $R_2$ and capacitor $C_F$. FIG. 4B is further simplified schematic of FIG. 4A circuit in which nodes 5 and 6 (see FIGS. 1, 2 and 3) are coupled together under assumption that $V_{S1}=V_{S2}$.

Figure 4C:
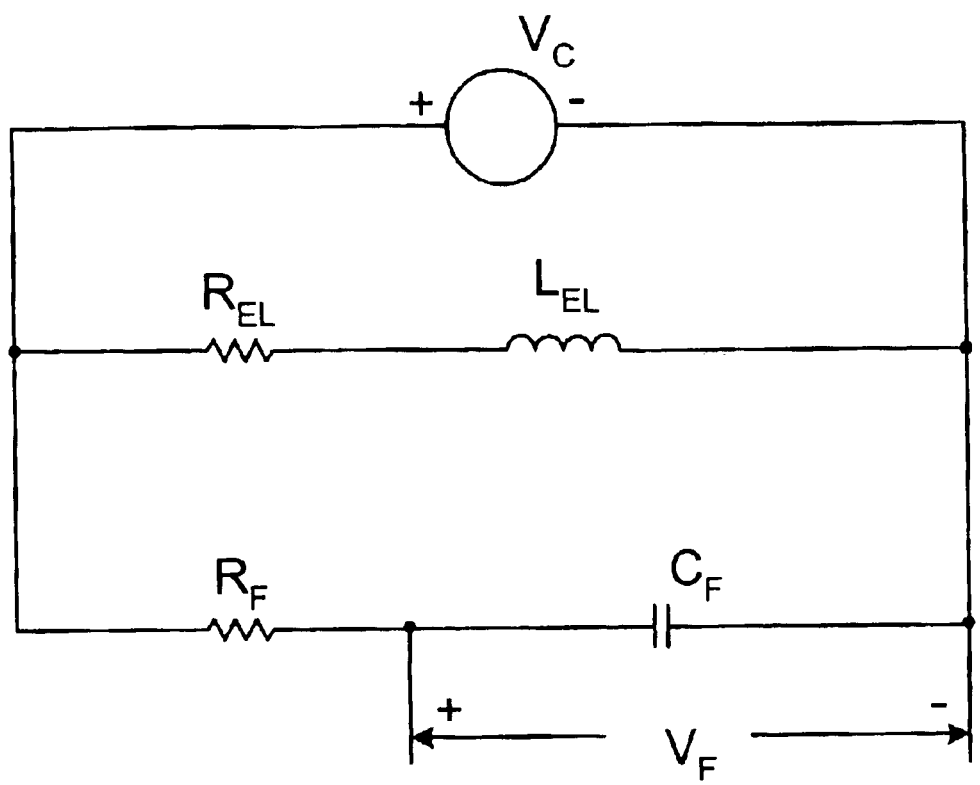
FIG. 4C is a further simplification of the circuit from FIG. 4B.

Further simplification is shown in FIG. 4C. The first time constant is defined as ratio of equivalent resistance $R_{EL}=R_L+R_{S1}\|R_{S2}$, and an equivalent inductance $L_{EL}=L_0+L_{S1}\|L_{S2}$, that is $R_{EL}/L_{EL}$ where, symbol $\|$ represents parallel combination of inductances $L_{S1}$ and $L_{S2}$, and resistors $R_{S1}$ and $RS_2$, respectively. In most practical realization of the regulators the leakage inductances $L_{S1}$ and $L_{S2}$ are more than orders of magnitude smaller that inductance of the output inductor $L_0$, in which case the equivalent inductance $L_{EL} \approx L_0$ and the first time constant becomes in first approximation $R_{EL}/L$.

The second time constant is defined as the product of equivalent resistance $R_F=R_1\|R_2$ and capacitance $C_F$, and is chosen to be within predetermined range of the first time constant, for example 5%–15%. The present invention is not limited to that range. In another embodiment, resistor $R_F$ and capacitor $C_F$ are chosen such that the second time constant is substantially equal to the first time constant.

The present invention thus provides the current sensor which is accurate enough in as well in sensing the DC current as in reproducing the current waveform in the output inductor $L_0$. It also recognizes that both the practical inductor and secondary windings of power transformer, represented as series connection of the inductance $L_{EL}$ and resistance $R_{EL}$, and a resistor-capacitor network, represented as series connection of resistor $R_F$ and capacitor $C_F$, are low pass filters operating on the same excitation voltage source $V_C$ shown in FIG. 4C.

The voltage across capacitor $C_F$ reconstructs the output inductor current waveform if the values of the resistor $R_F$ and capacitor $C_F$ are chosen such that the first and the second time constant are equal:

$$\frac{1}{R_F C_F} = \frac{R_{EL}}{L_0} \qquad (\text{Eq. 3})$$

Figure 5A:
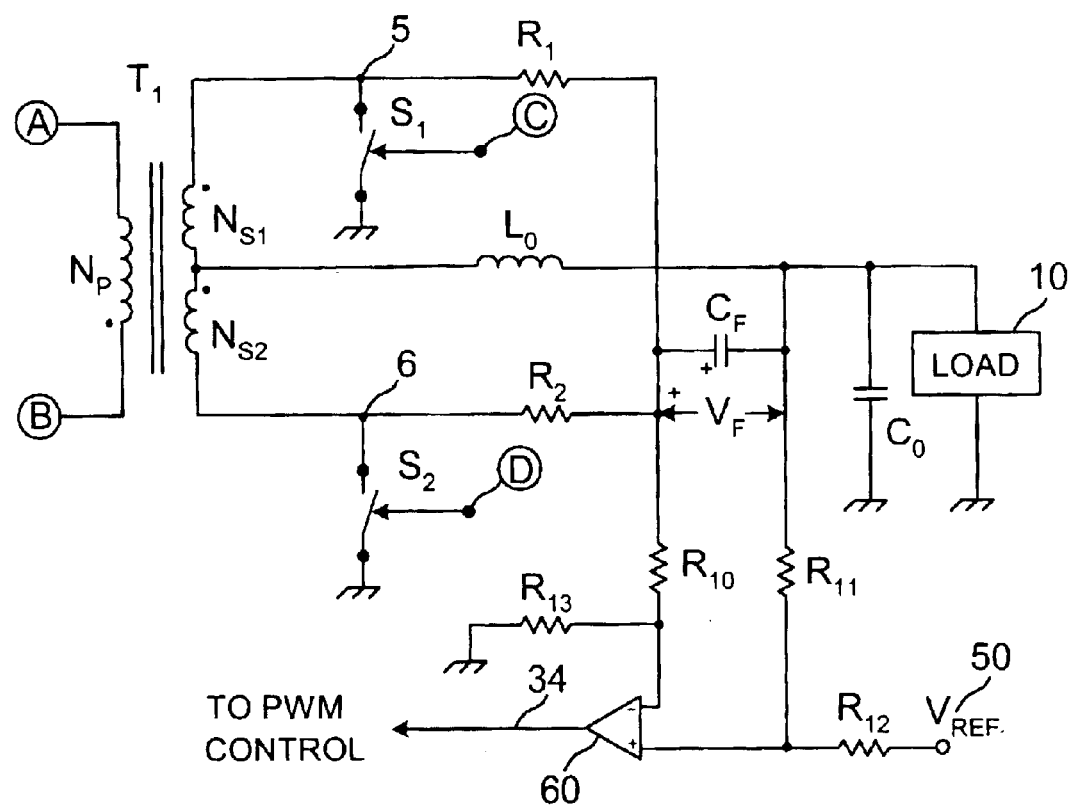
FIG. 5A is a schematic circuit diagram of the invention used for over-current protection.

In this case, the instantaneous voltage $V_F$ across capacitor $C_F$ is equal to the voltage across the equivalent resistance $R_{EL}$ of the inductor and is proportional to the instantaneous inductor current. As will be readily understood by those skilled in the art, however, the above condition is hard to maintain in practice for all operating conditions of the converter since inductance of the inductor reduces with increasing the load current and as resistances of the inductor secondary windings of the transformer increase as the temperature increases. These changes may cause a slight mismatch in the time constants which should be taken into account during design. In addition, the DC voltage $V_F$ across the capacitor $C_F$ is also proportional to a temperature within the switching regulator FIG. 5A shows one possible application of the invention implemented in the switching regulator of FIG. 1. The functions of inductor current signal processing circuitry 30 and over-current protection circuitry 21 of FIG. 1 circuit are realized with comparator 60, resistors $R_{10}$, $R_{11}$, $R_{12}$ and $R_{13}$ and reference voltage $V_{REF}$ 50. Resistor $R_{10}$ is coupled between the inverting input of comparator 60 and the first terminal of capacitor $C_F$, while resistor $R_{11}$ is coupled between the second terminal of capacitor $C_F$ and non-inverting input of comparator 60. An offset resistor $R_{13}$ is coupled between non-inverting input of the comparator 60 and reference voltage $V_{REF}$ 50, and second offset resistor $R_{13}$ is coupled between the inverting input of comparator 60 and output ground. Offset resistors $R_{12}$ and $R_{13}$ thereby establish an initial offset voltage which forces comparator 60 to be in the off-state (chosen to be logic high signal) with a normal current through inductor $L_0$, that is with a DC voltage across capacitor $C_F$ below a pre-determined level (corresponding to DC offset). As the current increases through inductor $L_0$, the DC voltage $V_F$ across capacitor $C_F$ increases, as well as does the voltage at the inverting input of comparator 60. The output of the comparator changes to zero logic level hen the-voltage at the inverting input of comparator 60 overcomes the voltage at the non-inverting input, thus causing PWM control to limit the output current.

Figure 5B:
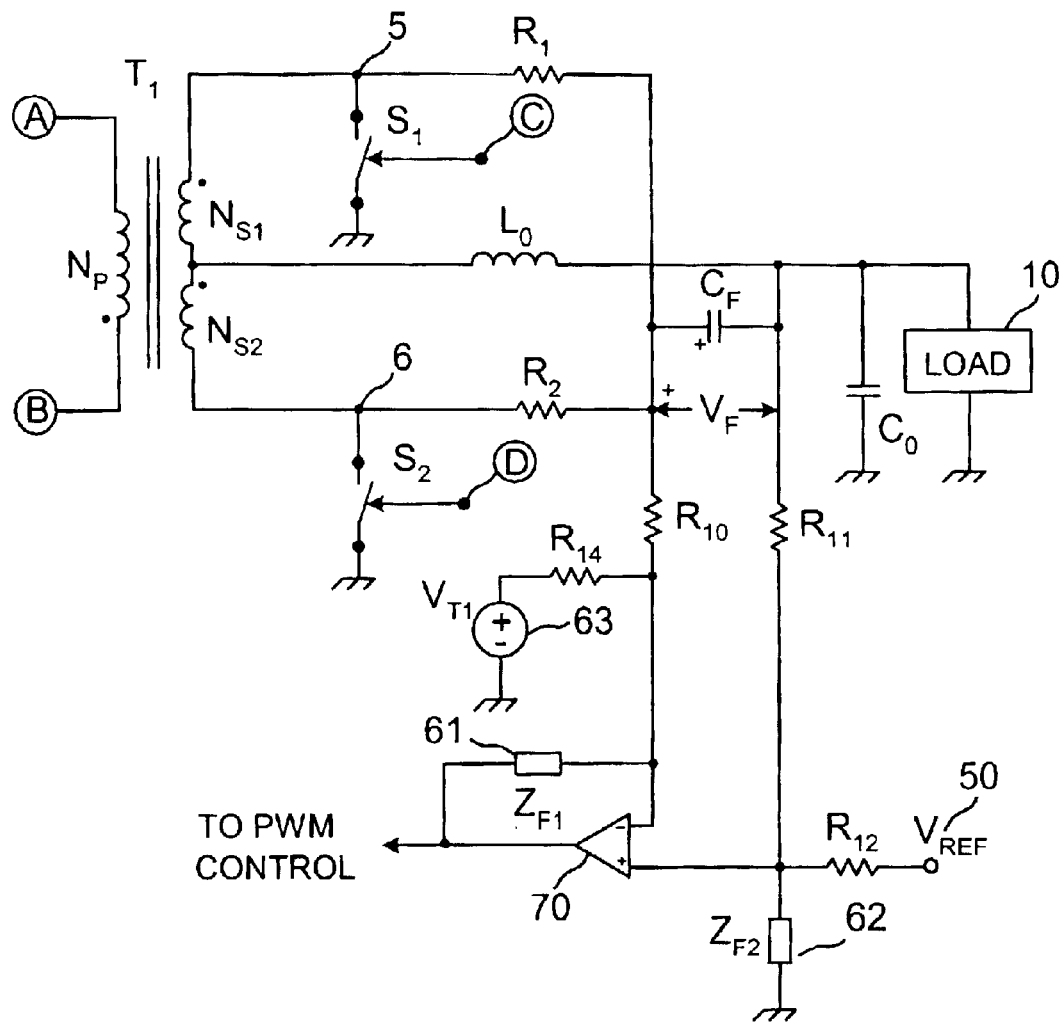
FIG. 5B is a schematic circuit diagram of another embodiment of the invention with temperature compensation.

Those skilled in art are familiar with methods to control output current. As described above, comparator 60 could be replaced with amplifier 70 and corresponding compensation impedances 61 and 62 as shown in FIG. 5B. A temperature dependant voltage source $V_{T1}$ 63 is added in series with offset resistor $R_{14}$ between the output ground and the inverting input of amplifier 70 in order to compensate for variations with the temperature in the DC equivalent resistance $R_{EL}$ of output inductor $L_0$ and secondary windings $N_{S1}$ and $N_{S2}$. The output of amplifier 70 is analog and could be used for regulating the output current or for over-current protection as described above.

Those skilled in the art are familiar with selection of the offset resistors $R_{12}$, $R_{13}$ and $R_{14}$ as shown in FIGS. 5A and 5B, for different methods of controlling the output current, such as constant current or a fold-back current limit as described above.

Many modification and other embodiments of the invention will come to the mind of one skilled in the art having the benefit of the teachings presented in the forgoing descriptions and the associated figures. Embodiments of the invention herein are shown using a half-bridge regulator with isolation transformer. The invention may also be applied to other similar switching regulator topologies, for example, push-pull regulator, full-bridge regulator, their derivatives and the like.

Therefore, it is to be understood that the invention is not to be limited to the specific embodiments disclosed, and that modifications and embodiments are intended to be included within the scope of the appended claims.

What is claimed is:

1. The switching regulator having an input coupled to a source of potential $V_{IN}$ and having an output providing an output potential $V_O$ and an output current, comprising:
   a switching circuit having at least two controllable power switches, and at least two rectifier switches connected in series at a second node, said at least two controllable switches each having a control node, and said first rectifier switch and said second rectifier switch having control terminal;
   a transformer having at least one primary winding connected to said input via said at least two controllable power switches, and a first and a second secondary windings connected together in series at a first node and said first secondary windings connected to said first rectifier switch at a third node and said second secondary winding connected to said second rectifier switch at a fourth node and said first secondary winding and said second secondary winding having an inherent DC winding resistances;
   an output stage having an output stage input and an output stage output, said output stage input connected to said first node and said second node, said output stage output connected to a load circuit, said output stage input and said output stage output having a common node;
   an inductor for providing output current to said load circuit having a first terminal connected to said output stage input and a second terminal connected to said output stage output and an inherent DC resistance there between;
   a current sensor having a current sensor input and a current sensor output and said current sensor input connected to said third node and to said fourth node and said second terminal of said inductor, said current sensor comprising a first and a second resistor and a capacitor, said first resistor having a first and a second terminal, said second resistor having a first and a second terminal, said capacitor having a first and a second terminal, said first terminal of said first resistor connected to said third node and said first terminal of said second resistor connected to said fourth node, said second terminal of said first resistor connected to said second terminal of said second resistor and said first terminal of said capacitor at a fifth node, said second terminal of said capacitor connected to said second terminal of said inductor; said current sensor providing a sensed voltage at said current sense output proportional to the inductor's said output current and derived from the voltage drop across said inherent DC resistances of said inductor and said inherent DC winding resistances of said secondary windings;
   a control circuit having a modulator circuit for generating control pulses for a driver circuitry, said driver circuitry generating drive signals for said controllable power switches and said rectifying first rectifying and said second rectifier switch.

2. The switching regulator as recited in claim 1, wherein said resistors and capacitor have respective values so that said current sensor is a substantially instantaneous current sensor.

3. The switching regulator as recited in claim 1, wherein said inductor has an inductance and said inherent DC resistance, said first secondary winding and said second secondary winding each have associated leakage inductances and said inherent DC resistances defining a first time constant; wherein said first resistor and said second resistor and said capacitor of said current sensor define a second time constant; and wherein the first time constant and the second time constant are within a predetermined range of each other.

4. The switching regulator as recited in claim 3, wherein the second time constant is substantially equal to the first time constant.

5. The switching regulator as recited in claim 1, further comprising a current control loop circuit cooperating with said modulator for controlling said controllable power switches responsive to said current sensor, and a voltage regulation loop circuit cooperating with current control loop for setting a current level.

6. The switching regulator as recited in claim 1, wherein said modulator circuit operates at a switching frequency; and wherein said current sensor defines a sensing bandwidth substantially above the switching frequency.

7. The switching regulator as recited in claim 1, further comprising an overload protection circuit connected to said current sensor output.

8. The switching regulator as recited in claim 1, further comprising a temperature compensation circuit connected to said current sensor output, said temperature compensation circuit compensates said current sensor output for temperature variations in said inherent DC resistance of said inductor and said inherent DC resistances of said first and second secondary windings within a predetermined range.

9. The switching regulator as recited in claim 8, wherein said temperature compensation circuit compensates said current sensor output for temperature variations within three percent.

10. The switching regulator as recited in claim 1, wherein said first rectifier switch and second rectifier switch are selected from the group consisting of current unidirectional switches, current bidirectional switches and voltage bi-directional switches.

11. The switching regulator having an input coupled to a source of potential $V_{IN}$ and having an output providing an output potential $V_O$ and an output current, comprising:
   a switching circuit having at least two controllable power switches, and at least two rectifier switches connected in series at a second node, said at least two controllable switches each having a control node, and said first rectifier switch and said second rectifier switch having control terminal;
   a transformer having at least one primary winding connected to said input via said at least two controllable power switches, and a first and a second secondary windings connected together in series at a first node and said first secondary windings connected to said first rectifier switch at a third node and said second secondary winding connected to said second rectifier switch at a fourth node and said first secondary winding and said second secondary winding having an inherent DC winding resistances and a leakage inductance;
   an output stage having an output stage input and an output stage output, said output stage input connected to said first node and said second node, said output stage output connected to a load circuit, said output stage input and said output stage output having a common node;

an inductor for providing output current to said load circuit having a first terminal connected to said output stage input and a second terminal connected to said output stage output and an inherent DC resistance, said inductor having an inductance and a inherent DC resistance, said inductance and said leakage inductances and said inherent DC resistance and said inherent DC winding resistances defining a first time constant;

a current sensor having a current sensor input and a current sensor output and said current sensor input connected to said third node and to said fourth node and said second terminal of said inductor for sensing a current passing through said inductor, said current sensor having a second time constant within a predetermined range of the first time constant so that said current sensor is a substantially instantaneous current sensor;

a control circuit having a modulator circuit for generating control pulses for a driver circuitry, said driver circuitry generating drive signals for said controllable power switches and said rectifying first rectifying and said second rectifier switch.

12. The switching regulator as recited in claim 11, wherein the second time constant is substantially equal to the first time constant.

13. The switching regulator as recited in claim 11, further comprising a current control loop circuit cooperating with said modulator for controlling said controllable power switches responsive to said current sensor, and a voltage regulation loop circuit cooperating with current control loop for setting a current level.

14. The switching regulator as recited in claim 11, wherein said modulator circuit operates at a switching frequency; and wherein said current sensor defines a sensing bandwidth substantially above the switching frequency.

15. The switching regulator as recited in claim 11, further comprising an overload protection circuit connected to said current sensor output.

16. The switching regulator as recited in claim 11, further comprising a temperature compensation circuit connected to said current sensor output, said temperature compensation circuit compensates said current sensor output for temperature variations in said inherent DC resistance of said inductor and said inherent DC resistances of said first and second secondary windings within a predetermined range.

17. The switching regulator as recited in claim 16, wherein said temperature compensation circuit compensates said current sensor output for temperature variation within a three percent.

18. The switching regulator as recited in claim 1, wherein said first rectifier switch and second rectifier switch are selected from the group consisting of current unidirectional switches, current bi-directional switches and voltage bi-directional switches.

19. A switching regulator having an input coupled to a source of potential $V_{IN}$ and having an output providing an output potential $V_O$ and an output current, comprising:

a switching circuit having at least two controllable power switches, and at least two rectifier switches connected in series at a second node, said at least two controllable switches each having a control node, and said first rectifier switch and said second rectifier switch having control terminal;

a transformer having at least one primary winding connected to said input via said at least two controllable power switches, and a first and a second secondary windings connected together in series at a first node and said first secondary windings connected to said first rectifier switch at a third node and said second secondary winding connected to said second rectifier switch at a fourth node and said first secondary winding;

an output stage having an output stage input and an output stage output, said output stage input connected to said first node and said second node, said output stage output connected to a load circuit, said output stage input and said output stage output having a common node;

an inductor for providing output current to said load circuit having a first terminal connected to said output stage input and a second terminal connected to said output stage output;

an instantaneous current sensor having a current sensor input and a current sensor output and said current sensor input connected to said third node and to said fourth node and said second terminal of said inductor for sensing a current passing through said inductor for sensing and instantaneous current passing through said inductor, range of the first time constant so that said current sensor is a substantially instantaneous current sensor;

a control circuit having a modulator circuit for generating control pulses for a driver circuitry, said driver circuitry generating drive signals for said controllable power switches and said rectifying first rectifying and said second rectifier switch.

20. The switching regulator as recited in claim 19, wherein said instantaneous current sensor comprises a first and a second resistor and capacitor.

21. The switching regulator as recited in claim 19, wherein said inductor has an inductance and said an inherent DC resistance and said first secondary winding and said second secondary winding each have associated leakage inductances and said inherent DC resistances defining a first time constant: wherein said first resistor and said second resistor and capacitor of said instantaneous current sensor define a second time constant; and wherein the first time constant and the second time constant are within predetermined range of each other.

22. The switching regulator as recited in claim 19, wherein said inductor has an inductance and said an inherent DC resistance and said first secondary winding and said second secondary winding each have associated leakage inductances and said inherent DC resistances defining a first time constant: wherein said first resistor and said second resistor and capacitor of said instantaneous current sensor define a second time constant; and wherein the second time constant is substantially equal to the first time constant.

23. The switching regulator as recited in claim 19, further comprising a current control loop circuit cooperating with said modulator for controlling said at least two controllable power switches responsive to said instantaneous current sensor, and a voltage regulation loop circuit cooperating with current control loop for setting a current level.

24. The switching regulator as recited in claim 19, wherein said modulator circuit operates at a switching frequency; and wherein said instantaneous current sensor defines a sensing bandwidth substantially above the switching frequency.

25. The switching regulator as recited in claim 19 further comprising an overload protection circuit connected to said instantaneous current sensor output.

26. The switching regulator as recited in claim 19 further comprising an temperature compensation circuit connected to said instantaneous current sensor output, said temperature compensation circuit compensates said instantaneous current sensor output for temperature variation in said inherent DC resistance of said inductor and said inherent DC resistances of said first and second secondary windings within a predetermined range.

27. The switching regulator as recited in claim 26, wherein said temperature compensation circuit compensates said current sensor output for temperature variation within three percent.

28. The switching regulator as recited in claim 1, wherein said first rectifier switch and second rectifier switch are selected from the group consisting of current unidirectional switches, current bidirectional switches and voltage bi-directional switches.

29. A method of sensing output current for regulating and protecting a switching regulator against overload, in which the switching regulator comprising an input adapted to be coupled to an input potential source and having an output providing an output potential and an output current to a load, a switching circuit comprising controllable power switches, and at least two rectifier switches connected in series, a transformer having at least one primary winding connected to said input via said controllable power switches, a first and second secondary winding connected together in series, said first secondary winding being connected to said first rectifier switch at a third node and said second secondary winding being connected to said second rectifier switch at a fourth node, an output stage having an input and an output, said output stage output being connected to the load, said input and said output having a common node; an inductor for providing output current to the load having a first terminal connected to said output stage input and a second terminal connected to said output stage output, a control circuit having driver circuitry and a modulator circuit for generating control pulses for said driver circuitry, said driver circuitry generating drive signals for said controllable power switches and for said rectifier switches, the method comprising:

sensing current passing through the inductor using a current sensor having a current sensor input and a current sensor output, said current sensor input connected to said third node and to said fourth node and said second terminal of said inductor for sensing a current passing through said inductor, said current sensor comprising a first and a second resistor and a capacitor, said first and second resistor coupled across said current sensor input and to said capacitor at a fifth node, said capacitor coupled across said current sensor output at said fifth node and said second terminal;

operating current control loop circuit to control said controllable power switches responsive to said current sensor, and a voltage regulation loop circuit cooperating with current control loop for setting a current level; and comparing signal at said current sensor output with a reference signal to obtain a drive signal that limits said output current.

30. The method as recited in claim 29, wherein the first and second resistor and capacitor have respective values so that sensing step comprises sensing a substantially instantaneous current passing through the inductor.

31. The method as recited in claim 30, wherein the output inductor has an inductance and a DC resistance and the first and second secondary windings have a DC resistance defining a first time constant; and further comprising the step of selecting the first resistor second resistor and capacitor of the current sensor to define a second time constant within predetermined range of the first time constant.

32. The method as recited in claim 29, wherein the output inductor has an inductance and a DC resistance and the first and second secondary windings have a DC resistance defining a first time constant; and further comprising the step of selecting the first resistor second resistor and capacitor of the current sensor to define a second time constant substantially equal to the first time constant.

33. The method as recited in claim 30, further comprising an temperature compensation circuit connected to said instantaneous current sensor output, said temperature compensation circuit compensates said instantaneous current sensor output for temperature variation in said inherent DC resistance of said inductor and said inherent DC resistances of said first and second secondary windings within a predetermined range.

34. The switching regulator as recited in claim 30, wherein said temperature compensation circuit compensates said current sensor output for temperature variation within three percent.

* * * * *